US008010452B2

(12) United States Patent
Falys et al.

(10) Patent No.: US 8,010,452 B2
(45) Date of Patent: Aug. 30, 2011

(54) COMMUNICATION ROUTING APPARATUS

(75) Inventors: Alain Jean Falys, London (GB); John Richard Jermy, Steyning (GB); Stefan John Foryszewski, Haslemere (GB); Christopher John Lowrie, Middlesex (GB)

(73) Assignee: Open Business Exchange Limited, London (GB)

( * ) Notice: Subject to any disclaimer, the term of this patent is extended or adjusted under 35 U.S.C. 154(b) by 1585 days.

(21) Appl. No.: 10/006,267

(22) Filed: Dec. 3, 2001

(65) Prior Publication Data

US 2002/0067723 A1 Jun. 6, 2002

(30) Foreign Application Priority Data

Dec. 6, 2000 (GB) .................................. 0029725.9

(51) Int. Cl.
*G06Q 40/00* (2006.01)
(52) U.S. Cl. .......................................................... 705/40
(58) Field of Classification Search .................... 705/40, 705/35
See application file for complete search history.

(56) References Cited

U.S. PATENT DOCUMENTS

| | | | | |
|---|---|---|---|---|
| 4,750,114 A * | 6/1988 | Hirtle | ............................ | 709/238 |
| 5,202,977 A | 4/1993 | Pasetes, Jr. et al. | | |
| 5,258,855 A * | 11/1993 | Lech et al. | .................... | 358/462 |
| 5,369,508 A * | 11/1994 | Lech et al. | .................... | 358/462 |
| 5,406,557 A | 4/1995 | Baudoin | | |
| 5,495,485 A * | 2/1996 | Hughes-Hartogs | ........... | 370/524 |
| 5,557,780 A | 9/1996 | Edwards et al. | | |
| 5,625,465 A * | 4/1997 | Lech et al. | ..................... | 358/448 |
| 5,708,828 A | 1/1998 | Coleman | | |
| 5,715,397 A | 2/1998 | Ogawa et al. | | |
| 5,768,416 A * | 6/1998 | Lech et al. | .................... | 382/180 |
| 6,094,505 A * | 7/2000 | Lech et al. | .................... | 382/180 |
| 6,397,232 B1 * | 5/2002 | Cheng-Hung et al. | ........ | 715/523 |
| 6,418,467 B1 * | 7/2002 | Schweitzer et al. | .......... | 709/223 |
| 6,426,952 B1 * | 7/2002 | Francis et al. | ................. | 370/380 |
| 6,519,062 B1 * | 2/2003 | Yoo | ................................ | 398/49 |
| 6,567,981 B1 * | 5/2003 | Jeffrey | ............................ | 725/80 |
| 2002/0116334 A1* | 8/2002 | Bennett et al. | .................. | 705/40 |

(Continued)

FOREIGN PATENT DOCUMENTS

CA 2 597 150 6/1999

(Continued)

OTHER PUBLICATIONS

Bucklin et al. Commercial Use of UPC Scanner Data: Industry and Academic Perspectives Source: Marketing Science, vol. 18, No. 3, Special Issue on Managerial Decision Making (1999),pp. 247-273, Published by: INFORMS, Stable URL: http://www.jstor.org/stable/193172, Accessed: Sep. 5, 2010.*

(Continued)

*Primary Examiner* — James P Trammell
*Assistant Examiner* — Daniel L Greene, Jr.
(74) *Attorney, Agent, or Firm* — William J. Sapone; Coleman Sudol Sapone P.C.

(57) ABSTRACT

A communication routing system receives signals from sources thereof and converts them into a standard format, using mapping definitions selected on the basis of their sources. Signals in the standard format are converted into output formats according to their destinations using mapping definitions selected on the basis of their destinations. In a preferred embodiment, the standard format involves distributing data from each received signal across a plurality of tables of a database.

14 Claims, 10 Drawing Sheets

U.S. PATENT DOCUMENTS

2003/0058277 A1 * 3/2003 Bowman-Amuah .......... 345/765

FOREIGN PATENT DOCUMENTS

| CA | 2 330 297 A1 | 10/2000 |
|---|---|---|
| EP | 0 737 019 A2 | 10/1996 |
| EP | 0 553 098 B1 | 12/1997 |
| EP | 0 909 108 A2 | 4/1999 |
| EP | 0 928 090 A2 | 7/1999 |
| WO | WO 95/20793 | 8/1995 |
| WO | WO 97/23836 | 7/1997 |
| WO | WO 98/15925 | 4/1998 |
| WO | WO 98/59480 | 12/1998 |
| WO | WO 99/21330 | 4/1999 |
| WO | WO 99/37070 | 7/1999 |
| WO | WO 99/44155 | 9/1999 |
| WO | WO 00/39979 | 7/2000 |
| WO | WO 00/48102 | 8/2000 |

OTHER PUBLICATIONS

Kumar et al. Dynamic Routing and Operational Controls in Workflow Management Systems, Source: Management Science, vol. 45, No. 2 (Feb. 1999), pp. 253-272, Published by: INFORMS, Stable URL: http://www.jstor.org/stable/2634874, Accessed: Sep. 5, 2010.*
McCarthy, The REA Accounting Model: A Generalized Framework for Accounting Systems in a Shared Data Environment Source: The Accounting Review, vol. 57, No. 3 (Jul. 1982), pp. 554-578, Published by: American Accounting Association, Stable URL: http://www.jstor.org/stable/246878, Accessed: Sep. 5, 2010.*
Sales document Postnet from Posten Sverige AB, Apr. 1999.
Bascet Infolink extract from brochure, 1989.
Extract from Postnet client magazine, Nov. 2, 1994.
Telecom Finland, Ediserver user's guide, May 1994.
E-grio webbhotell Teknisk Manual.
The Quick answer, "Simplify your Christmas Card and Other Things" Alex Mulvey, vol. II, No. 11, Nov. 2000.
EDI*LINK for Windows NT vesjon 2.1, Oct. 31, 1996.
The AMTrixTM System, Frontec AMT, 1998.
The Quick Answer, vol. 6, Issue 1, Tom Marcellus, Jan. 1995.
The Quick Answer, "Create, Print Invoices with Unlimited Number of Line Items" Jeff Nitka, May 1995, vol. 6, Issue 5.
Microsoft Advanced Word '97, Mailmerge It Together, Univ. N. Texas, Feb. 1998.
AFIPS Conference Proceedings, 1980 National Computer Conference "Programming with Data Frames for Everyday Items", David Embley.
Validation with Java and XML Schema, Part 1, Brett Mclaughlin, Javaworld.com, Aug. 8, 2000.
Legacy Systems "Maximizing Accuracy in Large Data Conversions" Paul J. Pantano, IT Pro, Sep./Oct. 1999.
Bulletin of the Techincal Committee on Data Engineering, IEEE Computer Society, Dec. 2000, vol. 23, No. 4 "Data Cleaning: Problems and Current Approaches" Rahm, Do.
Aditel Products "Aditel Business Network", (undated).
JFTP Client 1.2 Customer documentation, Aditel, Inc., 1999.
Aditel Products, "Communication Services" (undated).
Aditel home base, "What is e-business?" (undated).
Aditel Customer Area, JCommerce Retail Partner Section (undated).
Aditel Brochure "JCommerce The WEbtelligent connection Solution" (undated).
Aditel Brochure "JFTP Communication" (undated).
Aditel Newsroom "Agfa-Gevaret w ins 1999 EDI Award" (undated).
Aditel Newsroom "The JCommerce Revolution" (undated).
Aditel Solutions "Solutions" (undated).
Aditel Products "Traditional EDI" (undated).
Ramavtal Electronisk handel WM. data SSDS 1996.
Viewlocity, "Message Builder Version 5 Amtrix 4.3" manual Jun. 2000.
Viewlocity, "Monitor" Amtrix 4.3 User Manual, Jun. 2000.
EDI Application Inteceptor 2.04 Unix, Training Material (undated).
Networking Working Group FTP memo Oct. 1985.
Telecom Finland User's Guide May 1994, Chapter 5 "Routing" Finland EDI Server.
Paynet V3.00 Handbuch System Decshreibung Aug. 16, 2000.
ISO 9735 (First Edition Jul. 15, 1988) Electronic Data Interchange for Admintration of Commerce and Transport (EDIFACT)—Application Level Syntax Rules.
UN/EDIFACT Message INVOIC release Nov. 11, 1999.
German Association of the Automotive Industry (VDA) recommendation 4906 of 1993.
PriceWaterhouse Cooper, "Study on Requirement Imposed by Member States for the Purpose of Chargeing Taxes for Invoices Produced by Electronic or other Means" Aug. 23, 1999.
"Proposal for a Council Directive" Commssion of the European Communities, No. 17, 2000.

* cited by examiner

| Destination Tag | Container | Attribute | Detail element | Min occurences | Max occurences | Element format type | Element size | Source of data 1 | Source of data n |
|---|---|---|---|---|---|---|---|---|---|
| Invoice | true | | false | 1 | 1 | | | | |
| InvoiceHeader | true | | false | 1 | 1 | | | | |
| InvoiceType | false | type | false | 1 | 1 | | | if fieldA=I then "invoice" else "credit note" | |
| InvoiceNumber | false | | true | 1 | 1 | text | 35 | fieldC | |
| Party | true | who | true | 2 | n | | | "supplier" | "buyer" |
| PartyID | false | | true | 0 | 1 | text | 80 | "id" from db | fieldB |
| Name | false | | true | 1 | 1 | text | 60 | "name" from db | null |
| Street | false | | true | 1 | 1 | text | 60 | "street" from db | fieldE |
| City | false | | true | 1 | 1 | text | 60 | "city" from db | fieldF |
| Region | false | | true | 1 | 1 | text | 60 | "region" from db | fieldG |
| PostCode | false | | true | 1 | 1 | text | 60 | "postcode" from db | fieldH |
| Ref | false | value | true | 0 | n | text | 80 | "QN" + fieldM | "OT" + fieldK |
| InvoiceDetails | true | | false | 1 | 1 | | | | |
| Line | true | | false | 1 | n | | | | |
| PartNumber | false | | true | 0 | 1 | text | 35 | fieldP[(L-1)*1] | |
| Quantity | false | | true | 0 | 1 | text | 15.3 | fieldP[(L-1)*1 + 1] | |
| UnitPrice | false | | true | 0 | 1 | number | 18.3 | fieldP[(L-1)*1 + 2] | |
| LineSubTotal | false | | true | 0 | 1 | number | 18.3 | fieldP[(L-1)*1 + 3] | |
| Total | false | | true | 0 | 1 | number | 18.3 | fieldT | |

Figure 11

COMMUNICATION ROUTING APPARATUS

FIELD OF THE INVENTION

The present invention relates to a communication routing apparatus and an invoice routing method and apparatus.

BACKGROUND TO THE INVENTION

A vast number of firms are involved in commerce which itself involves a massive traffic in invoices. Traditionally, invoices have been distributed largely by conventional mail. However, electronic communication of invoices has become more commonplace.

Electronic distribution of invoices suffers from the problem of incompatibility between the accounting practices and systems of the many organisations which are involved in transactions either as vendors or purchasers.

SUMMARY OF THE INVENTION

It is an object of the present invention to provide a routing system for invoices, or indeed other data, which overcomes the incompatibility problem described above or the like.

According to the present invention, there is provided a communication routing apparatus comprising:—
- input transmission line means;
- output transmission line means;
- input processing means for processing signals received from the input transmission line means into an intermediate form having predetermined characteristics, the processing of each signal being dependent on its source;
- output processing means for processing signals in said intermediate form, produced by the input processing means, into signals in selected forms, the processing of each signal being dependent on its destination; and
- transmission means for transmitting signals, produced by the output processing means, via the output transmission line means to their destinations.

Thus, the parties to a communication need not themselves be able to convert signals between their respective formats.

The input and output transmission line means may be implemented using the same physical electrical or optical conductors. The transmission line means preferably provide a connection to the Internet.

Preferably, an apparatus according to the present invention includes means storing a plurality of input signal processing mapping definitions, wherein the input processing means is configured to select an input signal processing mapping definition in dependence on the source of the signal being processed and process said signal according to the selected input signal processing mapping definition to convert said signal into said intermediate form.

Preferably, an apparatus according to the present invention includes means storing a plurality of output signal processing mapping definitions, wherein the output processing means is configured to select an output signal processing mapping definition in dependence on the destination of the signal being processed and process said signal according to the selected output signal processing mapping definition to convert said signal into the form required according to its destination.

Preferably, an apparatus according to the present invention includes storage means for storing signals produced by the input processing means, wherein the output processing means reads signals in said intermediate form from the storage means before processing them.

Preferably, an apparatus according to the present invention includes storage means for storing signals, received by the input processing means, so as to maintain a record of received signals.

Preferably, the input processing means is adapted to determine the source of a received signal from a buffer location from which it is taken for processing and select the appropriate input mapping definition in dependence thereon. More preferably, the input processing means is adapted to produce a plurality of signals in said intermediate form from a received signal comprising one transmission session.

Preferably, the output signal processing means is adapted to obtain a signal destination id from each intermediate form signal being processed and select the appropriate output mapping definition in dependence thereon. More preferably, the output signal processing means is configured to send its output signals to buffer means selected in dependence on the destinations thereof.

Preferably, the input processing means is configured to apply the selected input mapping definitions to perform data format conversions on data represented by said received signals. More preferably, the input processing means is configured to add data to that represented by said received signals.

Preferably, the output processing means is configured to apply the selected output mapping definitions to perform data format conversions on data represented by said intermediate form signals.

Preferably, the input, intermediate form and output signals represent data files.

The present invention also extends to a method and apparatus for routing invoices.

An invoice routing apparatus according to the present invention comprises:—
- receiving means for receiving invoices;
- input processing means for processing received invoices into an intermediate form having predetermined characteristics, the processing of each invoice being dependent on the identity of the raiser of the invoice;
- output processing means for invoices in said intermediate form, produced by the input processing means, into invoices in selected forms, the processing of invoice in said intermediate form being dependent on the identity of the party being invoiced; and
- transmission means for transmitting invoices, produced by the output processing means to their destinations.

An invoice routing method according to the present invention comprises:—
- receiving an invoice;
- electronically processing said received invoice into an intermediate form having predetermined characteristics in dependence on the identity of the raiser of the invoice;
- electronically processing said intermediate form invoice into an invoice in a form selected in dependence on the identity of the party being invoiced; and
- sending said invoice in said selected form to its destination.

DETAILED DESCRIPTION OF THE PREFERRED EMBODIMENT

An embodiment of the present invention will now be described, by way of example, with reference to the accompanying drawings.

Figure 1:
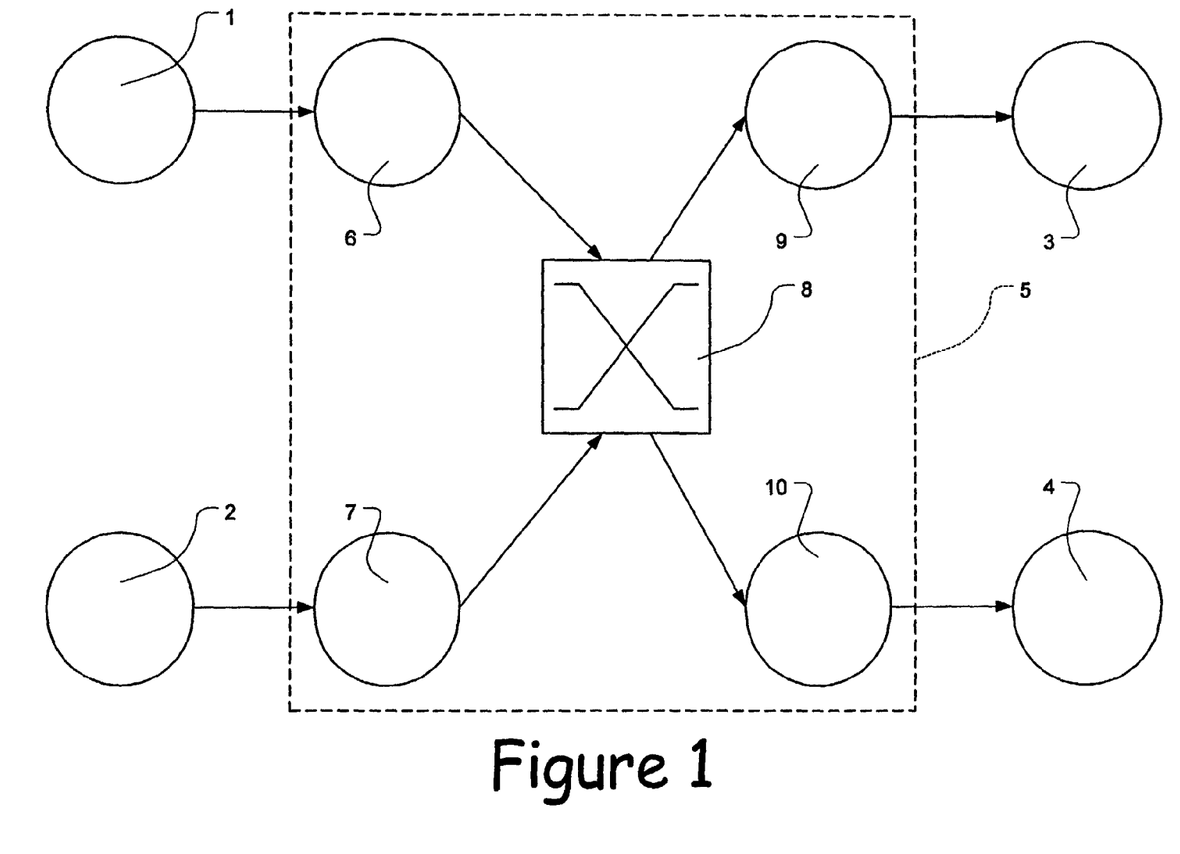
FIG. 1 is a generalised dataflow diagram of a system including a routing apparatus according to the present invention.

Referring to FIG. 1, first and second data transmission processes 1, 2 need to transmit data to first and second data receiving processes 3, 4. However, there is no agreement between these processes 1, 2, 3, 4 as to the data format that should be used for such transmissions.

One solution would be for the first and second data transmission processes 1, 2 to convert the transmitted data into the form required by the destination data receiving process 3, 4. However, this requires the transmitting process 1, 2 to know the current required data format of the destination data receiving process 3, 4. Alternatively, the data format conversion could be carried out at the destination data receiving process 3, 4. However, this would require the data receiving processes 3, 4 to have a set of data conversion routines for all of the data transmission processes 1, 2 from which it might receive a signal. These arrangements are undesirable because each new process 1, 2, 3, 4 which is added potentially requires N new conversion routines, where N is the number of data transmission processes when a data receiving process is added and the number of data receiving processes when a data transmission process is added. Furthermore, when the format used by a non-converting process is changed, this information must be propagated to all of the converting processes.

The solution to this problem is the provision of an intelligent router 5. The intelligent router 5 performs both routing and signal format conversion. At most, the intelligent router 5 comprises an input signal conversion process 6, 7 for each data transmission process 1, 2, a routing implementation 8 and an output signal conversion process 9, 10 for each data receiving process 3, 4.

Signals from the first data transmission process 1 are converted into a standard intermediate format by the respective input signal conversion process 6 and then routed to the appropriate output data conversion process 9, 10, for conversion from the standard intermediate format into the appropriate format for its destination, by the routing implementation 8 according to its address. A signal from the second data transmission process 2 is similarly processed although it is converted into the standard intermediate format by the other input conversion process 7.

In this case, it can be seen that each new data transmission process or data reception process can only require the addition on a maximum of one new conversion process. Furthermore, changes in formats used by data transmission processes and data receiving processes need only be notified to the intelligent router 5.

It will be appreciated that the intelligent router 5 may be distributed, consisting of an internal network with conversion processes available at its boundaries. Furthermore, the routing implementation 8 may be provided by one or more dedicated processes or by aspects of the input and/or output conversion processes.

Figure 2:
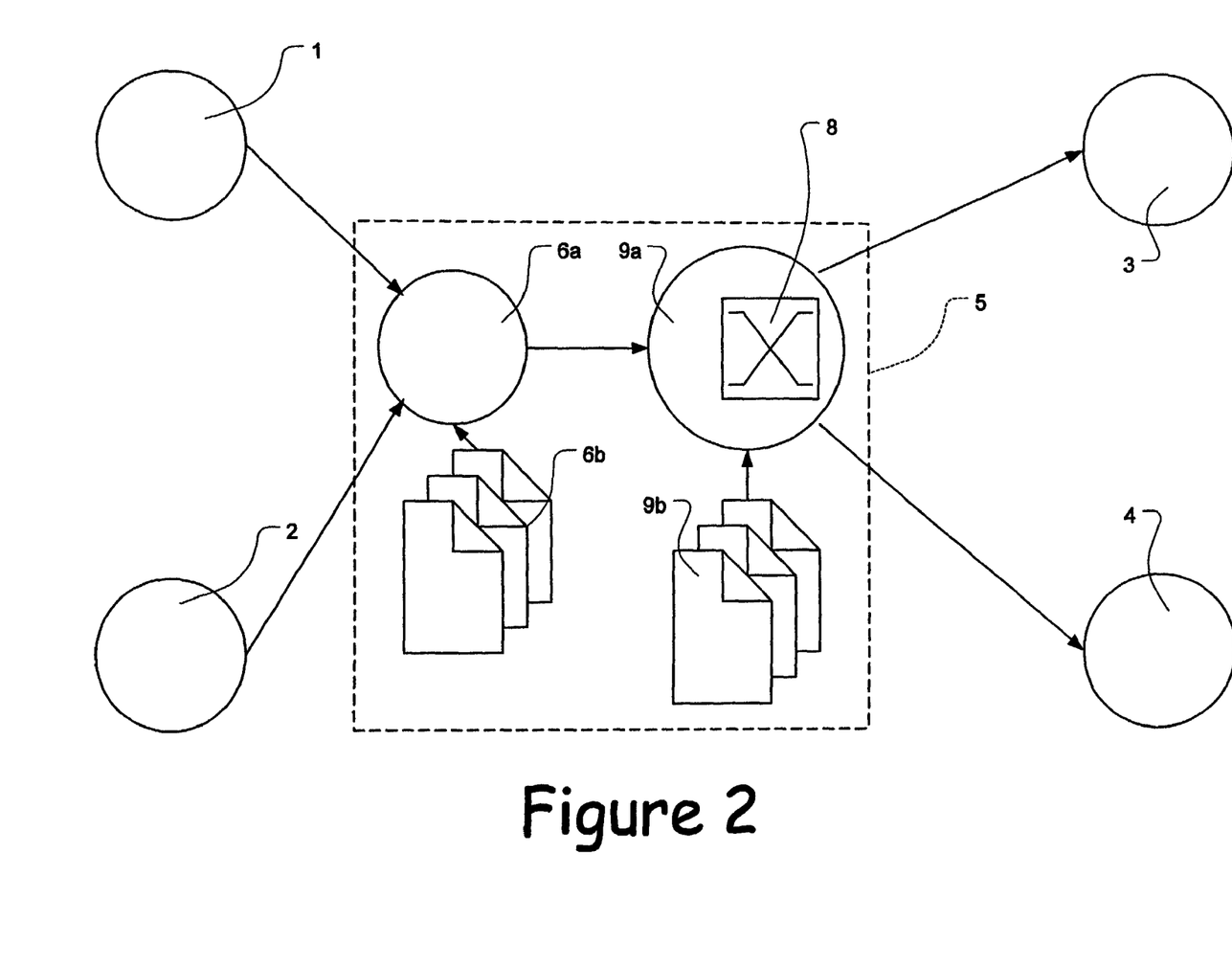
FIG. 2 is a generalised dataflow diagram of a further system including a routing apparatus according to the present invention.

Referring to FIG. 2, the input signal conversion processes 6, 7 of FIG. 1 are replaced by a generic input signal conversion process 6a which processes incoming signals according to mapping definitions 6b selected on the basis of the source of the signal being converted. Similarly, the output signal conversion processes 9, 10 of FIG. 1 are replaced by a generic output signal conversion process 9a which processes signals according to mapping definitions 9b on the basis of the destination of the signal being converted. The genetic output signal conversion process 9a also provides the routing implementation.

The present invention may be implemented at various layers of the International Standards Organization (ISO) networking reference model. An application layer, i.e. layer 7, embodiment for the transfer of invoice data, including credit note data and the like, will now be described by way of example.

Figure 3:
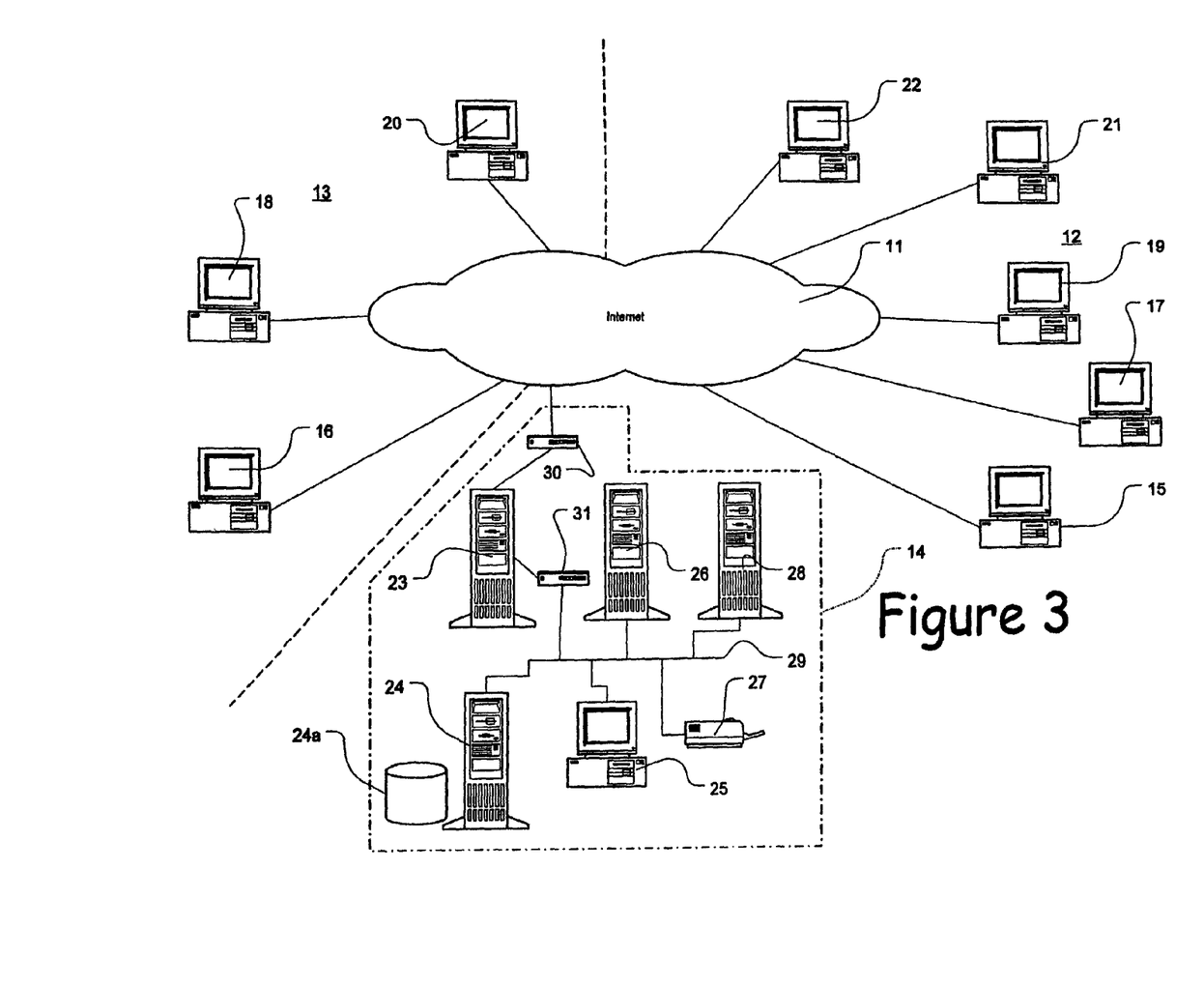
FIG. 3 shows the elements of system employing an open systems interconnection (OSI) layer 7 routing apparatus of the form illustrated in FIG. 2.

Referring to FIG. 3, the Internet 11 extends across a plurality of countries 12, 13 (only two shown). An invoice routing system 14 is connected to the Internet 11. Additionally, first, second, third and fourth supplier computers 15, 16, 17, 18 belonging to first, second, third and fourth suppliers respectively, first and second buyer computers 19, 20 belonging to first and second buyers respectively, a head office computer 21 belonging to a holding company and a fiscal authority computer 22 are connected to the Internet 11.

The first, second and third supplier computers 15, 16, 17 are conventional computers with access to invoice files (not shown) created by the respective supplier's accounting system (not shown). The fourth supplier computer 18 does not have access to invoice data files and invoices must be generated manually in co-operation with the invoice routing system 14.

The buyer computers 19, 20 are conventional computers which can generate files that are accessible to the respective buyer's accounting systems (not shown).

The head office computer 21 and the fiscal authority computer 22 are also conventional computers.

The first and third suppliers are subsidiaries of the holding company operating the head office computer 21.

The first and third supplier computers 15, 17 provide invoice data in a first format. The same format is used because they belong to the same group of companies. The second supplier computer 16 provides invoice data in a second format. The first and second buyer computers 19, 20 require invoice data in third and fourth formats respectively.

The invoice routing system 14 comprises a web server machine 23, a data warehouse machine 24, an administration machine 25, an invoice processing machine 26, a printer 27, a security server machine 28, a first firewall 30 between the web server 23 and the Internet 11, second firewall 31 between the web server machine 23 and the local area network. The local area network 29 provides for communication between the various machines 23, 24, 25, 26, 28 and the printer 27.

The data warehouse machine 24 provides a platform for a relational database management system (RDBMS) 24a. The relational database management system 24a contains tables storing:

(a) system configuration data, such as country codes, valid options for date and currency formats and the details of mapping definitions;
(b) client data, such as names, addresses, tax numbers, and data mapping definition ids; and
(c) audit trail and transaction records.

The supplier, buyer, head office and fiscal authority computers 15, . . . , 22 all interact with the invoice routing system 14 through the agency of the web server machine 23 and do not need to have software other than a JAVA® software-enabled web browser in order to make use of the invoice routing system 14. (Java® is a registered trademark of Sun Microsystems, Inc.)

Figure 4:
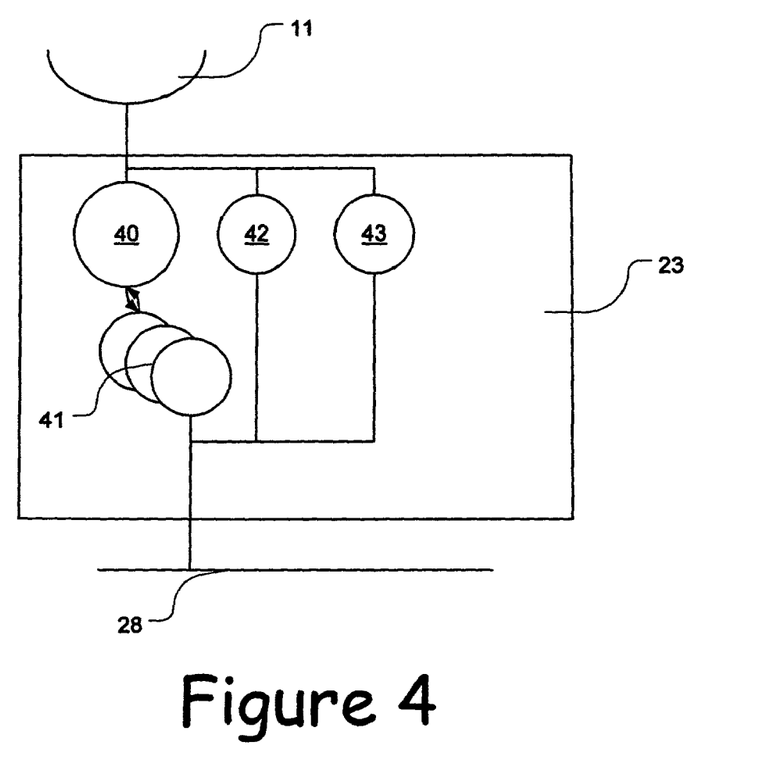
FIG. 4 illustrates the configuration of the web server machine of FIG. 3.

Referring to FIG. 4, the web server machine 23 supports a web server 40 enabled for secure communication, e.g. using SSL (secure sockets layer), a plurality of computer graphics interface (CGI) scripts 41, a file reception process 42 and a file transmission process 43.

The transfer of invoice data from the first supplier computer 15 to the invoice touting system 14 will now be described.

Figure 5:
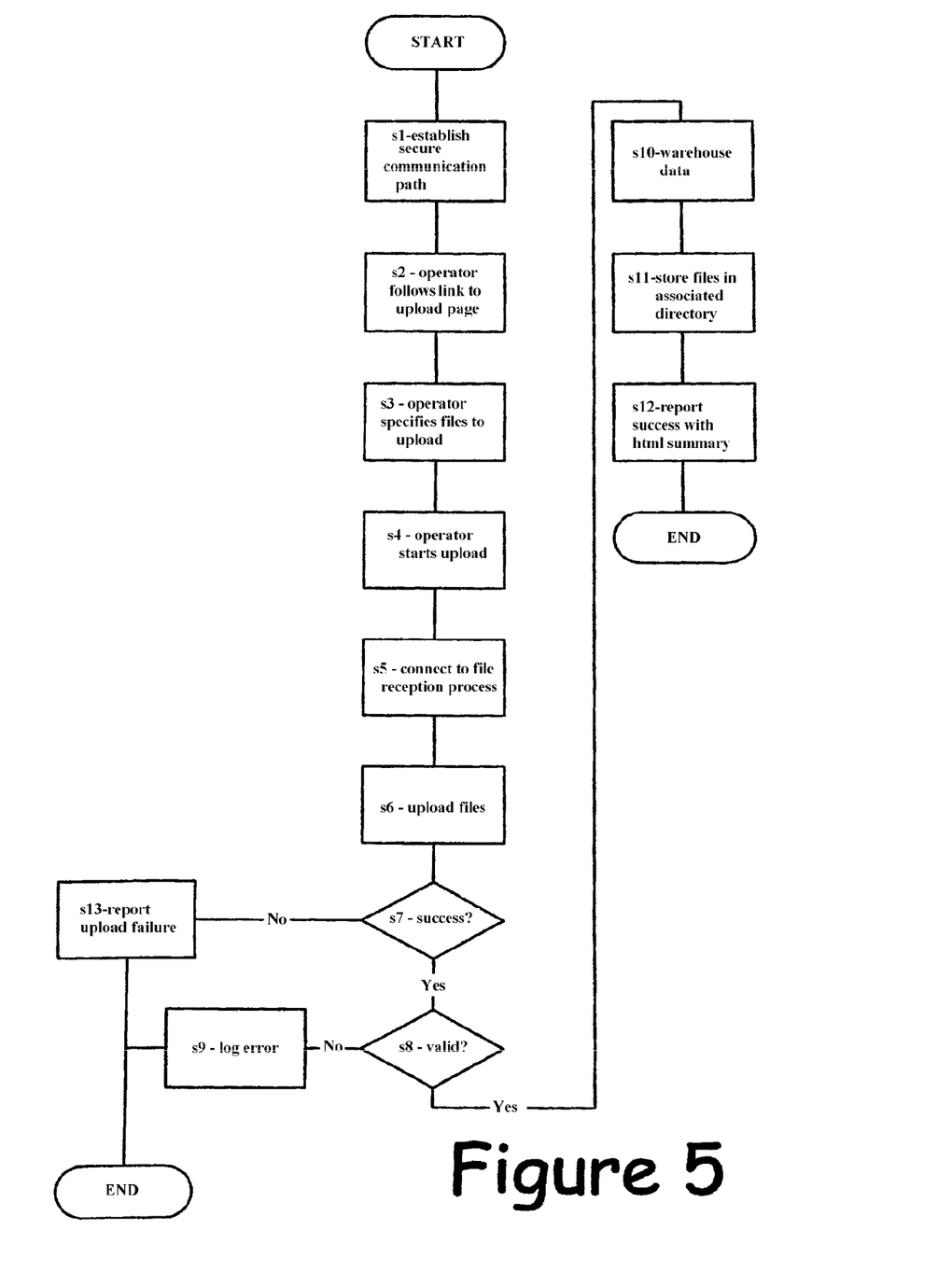
FIG. 5 is a flowchart illustrating a first method for the transfer of invoice data to the invoice routing system of FIG. 3.
Figure 6:
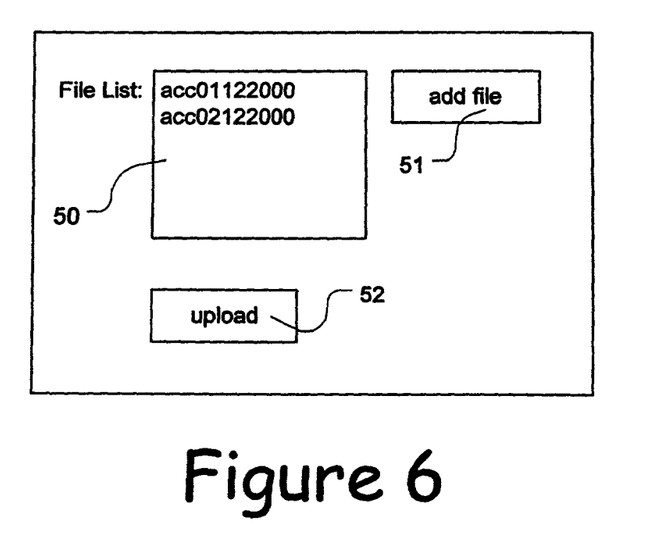
FIG. 6 shows the user interface of an applet used in the method illustrated in FIG. 5.

Referring to FIG. 5, in order to upload invoice data to the invoice routing system 14, the operator of the first supplier computer 15 uses a web browser to "log in" to the web server 40 and establish a secure communication path (step s1). Having logged in, the operator can follow a hypertext link to an invoice file upload page (step s2). The file upload page includes a JAVA software applet. The applet is signed so that it has access to the file system of the first supplier computer 15. As shown in FIG. 6, the applet's user interface includes a list box 50 for listing the files to be uploaded, a button 51 for opening a file selection dialog so that the operator can specify the invoice files to be uploaded and a button 52 for starting the file transfer.

When the user has specified the files to be uploaded (step s3) and starts the file transfer (step s4), the applet establishes connection to the file reception process 42 at the web server machine 14 (step s5) and transmits the entered file count and the specified files to the file reception process 42 (step s6). If the upload is successful (step s7), the file reception process 42 validates the digital certificate sent with the file through a dialogue with the security server machine 28 (step s8). If the certificate is not valid the file reception process 42 logs an error (step s9) otherwise it sends a copy of the received file or files to the data warehouse machine 24 (step s10) where they are stored temporarily, e.g. for 5 days, so that the files do not need to be uploaded again if the conversion process fails. The file of received invoice data is then sent to a directory, associated with the uploading party and which is accessible to the invoice processing machine 26 (step s11). The operator is then informed of the success of the upload (step s12). The operator is also informed of upload failures (step s13).

The uploading of invoice data files from the second supplier computer 16 is performed in the same way.

The third supplier computer 17 uses an automatic upload process. This process is triggered by scheduling software on the third supplier computer 17 and is effected by a JAVA software application which performs a file transfer protocol (FTP) transmission over a hypertext transfer protocol (HTTP) link to the web server machine 23 and prohibits operator intervention. The use of FTP over an HTTP link avoids the need for a direct FTP link between the third supplier computer 17 and the invoice routing system 14. The use of this, and the prohibition of operator intervention increases system security.

Figure 7:
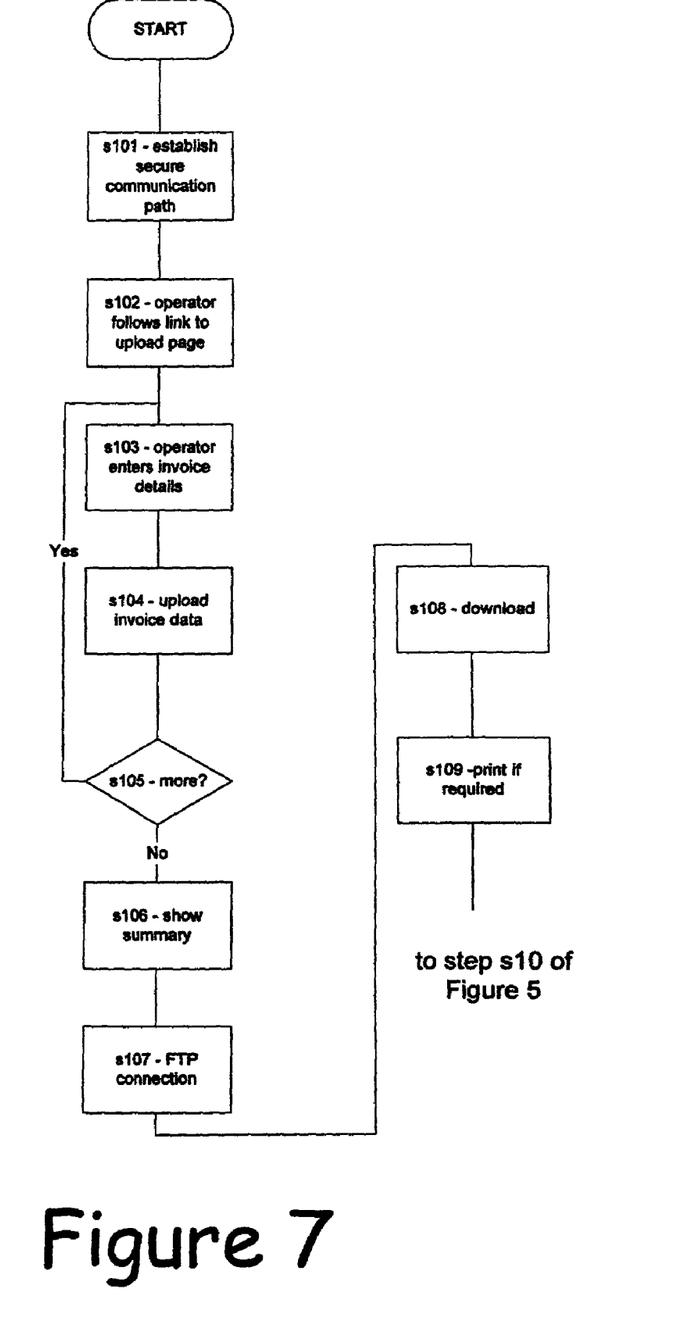
FIG. 7 is a flowchart of a method of generating invoices using the invoice routing system of FIG. 3.

The fourth supplier computer 18 does not have access to invoice data files suitable for uploading, for instance the owner uses manual accounts. Referring to FIG. 7, in this case, the operator of the fourth computer 18 logs into the web server 40 (step s101) and follows a link to a set of invoice generation html forms, which provide inputs for CGI scripts 41. The set of forms enables the operator of the fourth supplier computer 18 to enter invoice details (step s102) and upload them to the web server machine 23 (step s103). The forms are generated using data in the data warehouse machine 24 so that, for instance, entry of a buyer id causes name and address data for the buyer to be filled in.

The operator uses the invoice generation forms to enter one or more invoices (steps s102 and s104). When each invoice has been entered, its data is submitted to a CGI script 41 at the web server machine 23. When there are no more invoices to upload (step s105), the operator is presented with a summary of the uploaded invoices and given the option of saving or saving and printing the invoices (step s106). An FTP connection is then established (step s107), using a signed applet received from web server machine 23, and the invoices are downloaded and stored (step s108) and optionally printed (step s109). The uploaded invoices are processed as in the case of the first supplier computer's uploading of invoice data, starting at step s7 of FIG. 5.

The invoice processing machine 24 implements the signal conversion processes 6a, 9a (FIG. 2), with the routing implementation 8 (FIG. 1) being provided by the output signal conversion process 9a.

Figure 8:
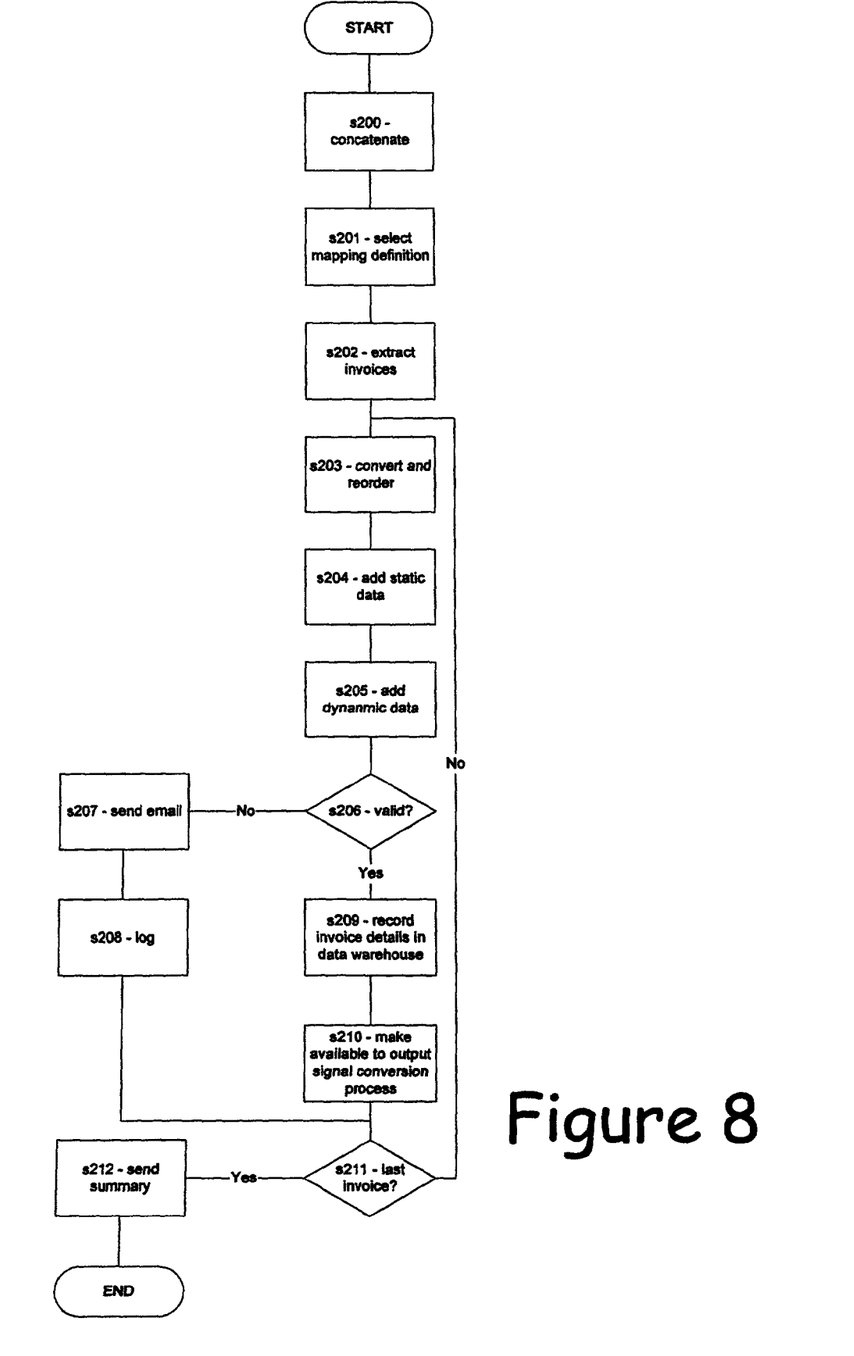
FIG. 8 is a flowchart of an input signal conversion process.

The input signal conversion process 6a processes invoice data from the file reception process 42 as follows. Referring to FIG. 8, the invoice files in the directory associated with a supplier are concatenated (step s200) and the identity of the directory, in which the invoice data is stored, is then used to select the appropriate mapping definition 6b from a database of mapping definitions at the data warehouse machine 24 (step s201). Thus, a first mapping definition is selected for invoices from the first and third supplier computers 15, 17, a second mapping definition is selected for invoices from the second supplier computer 16 and the third mapping definition is selected for invoices from the fourth supplier computer 18. Using information from the selected mapping definition, the invoice data file being processed is split into its constituent invoices (step s202).

Each invoice is then converted by the input signal conversion process into a standard intermediate format according to the selected mapping definition. This conversion process includes preprocessing them to separate their individual fields and copying them to the corresponding fields of the intermediate format as necessary (step s203), the addition of static data, e.g. the name and address of the source of the invoice (step s204), and system dynamic data including a transaction code, a transaction id and the mapping definition used (step s205). The converted invoice data is then validated (step s206). If the converted data is invalid, the source of the invoice is notified of the error by email (step s207) and the error is logged (step s208).

If the converted data is valid, its details are stored by the relational database management system 24a at the data warehouse machine 24, so that they are available for queries from the suppliers, buyers, head offices and fiscal authorities concerned, (step s209) and the standard intermediate format data is made available to the output signal conversion process (step s210).

Following steps s208 and s210, it is determined whether all of the invoices in the concantenated file have been processed (step s211) and when all of the invoices have been processed, an html summary is sent by email to the supplier concerned (step s212).

Figure 9:
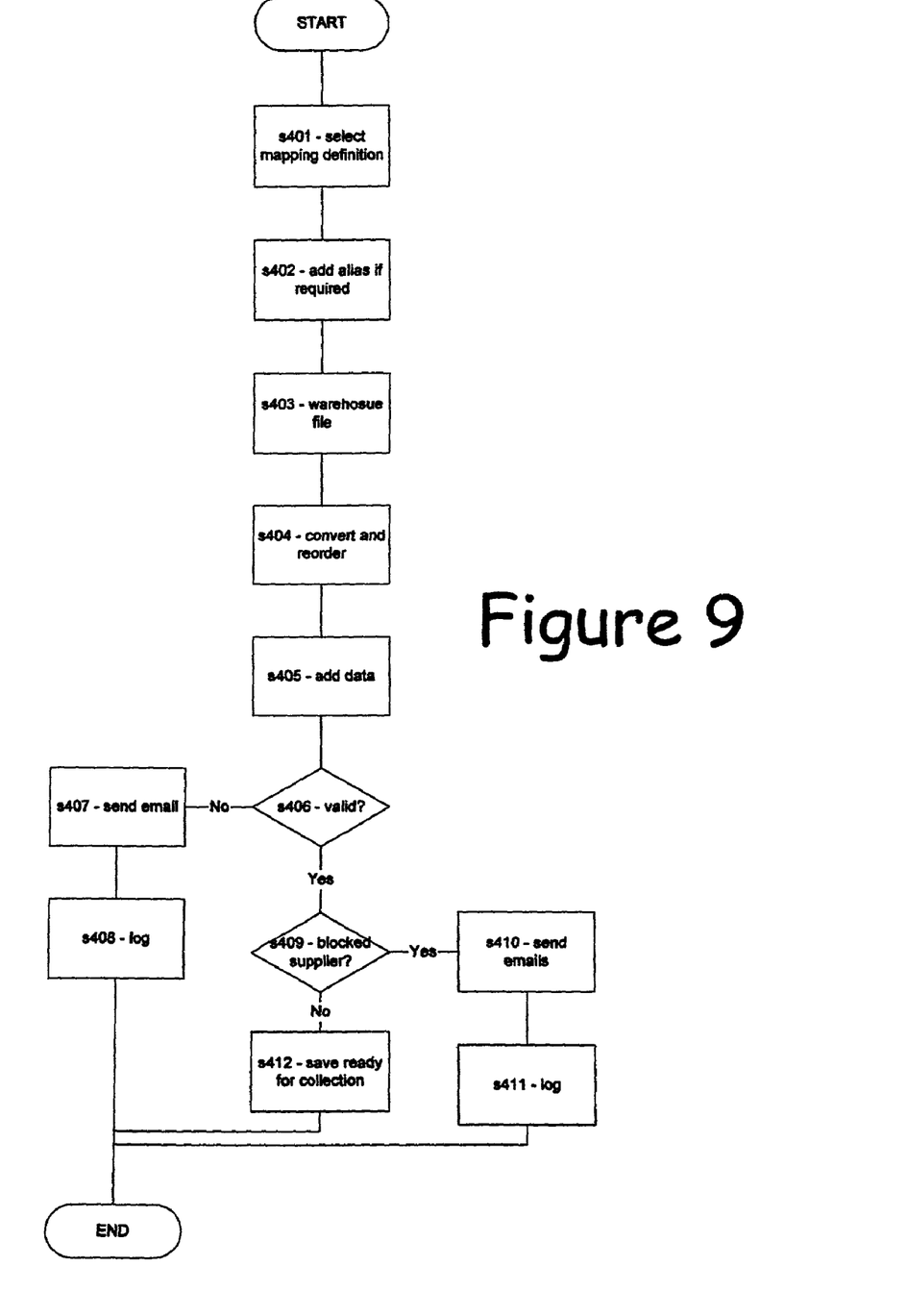
FIG. 9 is a flowchart of an output signal conversion process.

Referring to FIG. 9, for each standard intermediate format invoice to be processed, the output signal conversion process 9a determines which mapping definition is required based on the buyer, to which the invoice is addressed (taken from a predetermined field of the standard intermediate format), and retrieves it from a database of mapping definitions 9b at the data warehouse machine 24 (step s401). It then adds a supplier alias, if required by the buyer according to the mapping definition (step s402). The supplier alias is a code for the supplier provided by the buyer to which the invoice is addressed. A copy of the unconverted invoice data is then saved at the data warehouse machine 24 where it will be maintained for a predetermined period in case a problem with the output conversion occurs (step s403). After the invoice copy has been saved, the output signal conversion process converts the invoice from the standard intermediate format into that required by the buyer to which it is addressed. This includes converting the contents of individual fields and reordering them as necessary (step s404) and the addition of static and derived data, e.g. amounts in alternate currencies, required by the buyer (step s405).

If the converted invoice fails to meet criteria specified by the buyer (step s406), an email notification is sent to the supplier who issued the invoice (step s407) and the error is logged (step s408). If the converted invoice is rejected because it is on the buyer's blocking list (step s409), email notifications are sent to both the supplier and the buyer (step s410) and the event is logged (step s411). Finally, if the converted invoice is acceptable, it is stored in a directory assigned to the buyer (step s412). This directory is accessible to the file transmission process 43 at the web server machine 23.

The blocking list is a list of suppliers from which the buyer will not accept invoices. An allow list is alternatively provided to specify the suppliers from whom a buyer will accept invoices.

Figure 10:
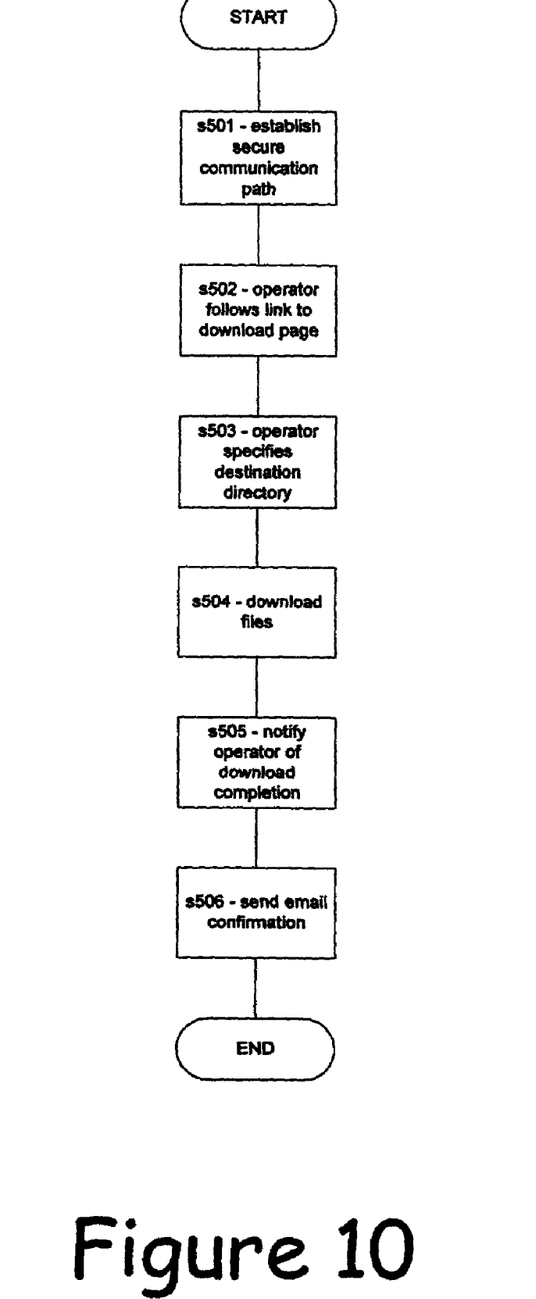
FIG. 10 is a flowchart of a invoice file download process.

Referring to FIG. 10, in order to download invoices addressed to the first buyer, the operator of the first buyer computer 19 logs into the web server 40 (step s501) and follows a link to a download page (step s502). The download page includes a signed applet which allows the operator to identify a destination directory for the downloaded invoices and a download initiating button. When the operator has specified a destination directory (step s503) and clicked on the button, the applet retrieves the buyer's invoices from the directory where they were stored by the output signal conversion process (step s504). When the file transfer is complete the operator is notified by the applet (step s505). Additionally, the file transmission process sends an email containing a summary of the downloaded files to the buyer (step s506).

The second buyer computer 20 uses an automatic download process. This process is triggered by scheduling software on the second buyer computer 20 and is effected by a Java application which performs FTP over an HTTP link to the web server machine 23 and prohibits operator intervention. The use of FTP over an HTTP link avoids the need for a direct FTP link between the second buyer computer 16 and the invoice routing system 14. The use of this, and the prohibition of operator intervention, increase system security.

Following the successful download of an invoice file, individual invoices are also sent to the respective buyer via e-mail in hypertext markup language (HTML) format. These invoice copies may include data, such as value added tax (VAT) registration numbers, that is not included the downloaded invoice file but which is required on printed invoices, which themselves may be a legal requirement.

The e-mails are received by the buyer's e-mail client (not shown) from where they can be stored, printed and/or distributed.

The supplier, buyer, head office and fiscal authority computers 15, . . . , 22 can be used to query data in the data warehouse machine 24 within secure HTTP sessions. The data that can be returned to the querying party depend on its legitimate area of interest. Thus, suppliers can access records of the invoices which they have generated, buyers can access records of the invoices addressed to them, parent/holding companies can access records of invoices generated by or addressed to their various subsidiaries and fiscal authorities can access records of invoices relating to transactions over which they have jurisdiction. The suppliers buyers, head office and fiscal authorities can also obtain HTML format invoices which can be printed out locally to provide a hard copy from the data warehouse machine 24.

Additionally, the operator of the invoice routing apparatus 14 can use the records of the invoices passing through the system to calculate charges to suppliers and buyers using the system.

The mapping definitions, referred to above, comprises sets of rules that map fields of invoice data files in one form onto corresponding fields of another form. The mapping definitions also define any data representation format conversions, e.g. yymmdd to ddmmyy for dates, and any additional static or derived data that needs to be added. The mapping definitions may also include rules for validating the result of the conversion process controlled thereby.

In the present example, the intermediate format is implemented using a plurality of tables of a relational database managed by the relational database management system 24a. The fields of the intermediate format stored in respective tables of the database. Thus, all supplier city address fields are stored in a supplier city address table and each invoice bought/ordered item line is stored in an item line table.

The contents of a mapping definition file 6b for converting input invoice data into the intermediate format illustrated above is shown in FIG. 11 (the column headers are shown in the interest of clarity and are not included in the file represented).

Figure 11:
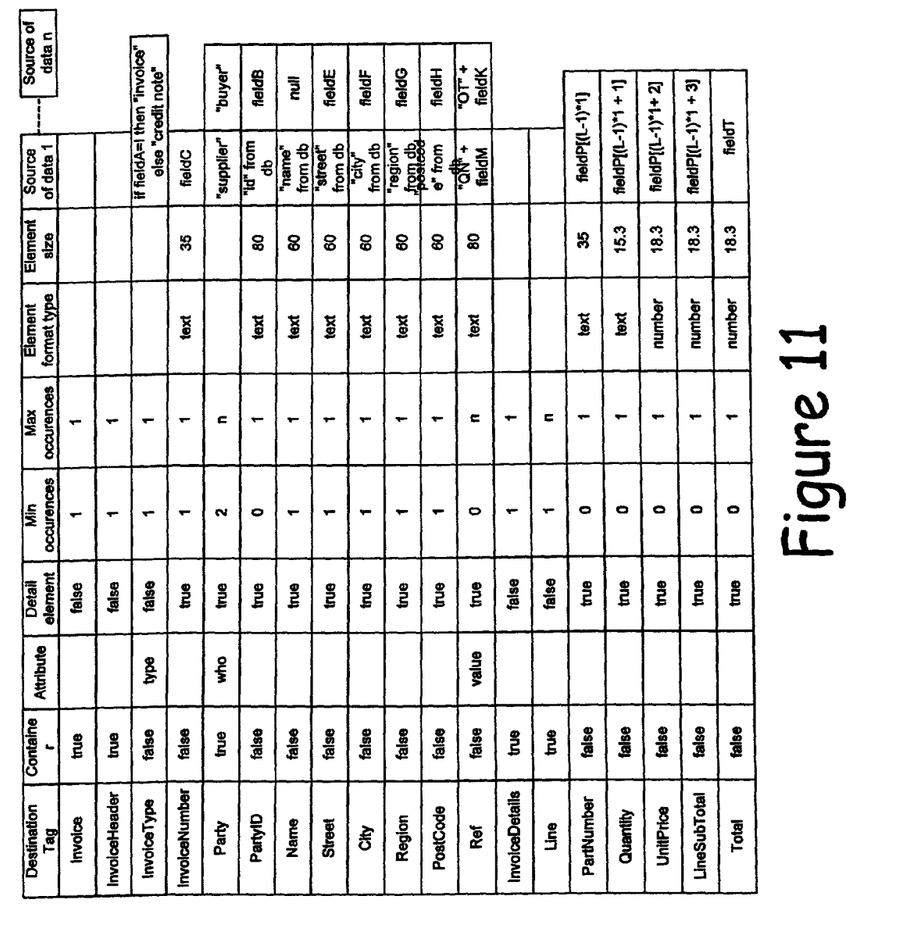
FIG. 11 illustrates a mapping definition file used by the system shown in FIG. 3.

Referring to FIG. 11, the mapping definition file 6b has a row for each label used in converting to the intermediate format. Each row comprises the label name, flags to indicate whether it is a container, i.e. contains other labels, and whether it has a data element, the name of any attribute used in the data field, minimum and maximum values for the occurrence of the data labelled by the label, the format of any data element, e.g. text or number, the size of the element and the data source for each occurrence of the data element.

The preprocessing, referred to above, uses knowledge about the field separators and/or field headers used in incoming invoice files so that the incoming invoice fields are separated in a consistent manner. However, at this stage no judgement as to the meaning of the fields is made.

The input signal conversion process 6a opens the mapping definition file 6b and first reads an Invoice label. No data is associated with this label but it is provided for possible future use. However, it is a container. Next an InvoiceHeader label is found. This label is a container and does not contain data. Next the process 6a an InvoiceType label. However, the mapping definition file 6b specifies that this tag has an attribute "type" and that the data for this attribute is "invoice" if fieldA form the pre-processed input file is "I" and otherwise "credit note". Consequently, the process inserts a row comprising the invoice's unique id and "invoice" or "credit note" into the invoice type table of the intermediate form database.

The next invoice header item is the invoice number and accordingly the process 6a inserts a row comprising the invoice's unique id, and the invoice number from fieldC into the invoice number table of the database.

The mapping definition file 6a specifies that there are two parties. Consequently, it inserts two rows into the party table of the database. The first row includes the invoice's unique id, a who field set to "supplier", the supplier's id from the system's client database, a link to a name record in a name database and a link to an address record in an address database. These name and address records are created using data from the system's client database.

The second row includes the invoice's unique id, a who field set to "buyer", the buyer's id from the fieldB of the input file, a link to a name record in a name database and a link to an address record in an address database. These name record is set to null in the name table and address record is created using data from fieldE, fieldF, fieldG and fieldH of the pre-processed input file.

There are also two Ref entries which cause reference records to be stored in a reference table. The records comprise the invoices unique id and a field comprising "QN" and "OT" respectively combined with data from the pre-processed input file.

An invoice details section, opened with an InvoiceDetails label, follows the invoice header section and it can be seen that this comprises a separate section for each line of the items ordered/bought and a total section. Some of these elements are numbers and the element size column specifies the formats for them with the number of digits available before and after a decimal point. The values for each line are taken from a field from the pre-processed file which is an array of elements that can be selected using the field name (fieldP) and an index. In the example shown, the index is calculated from the line number (L) where the first line is line 1. Each line is stored as a respective record in a line items table of the database.

Since the intermediate format uses a database, conventional data merging techniques, such as mail merging, with mapping definitions in the form of templates can be used to convert the intermediate format data into files having formats appropriate for their destinations.

It can also be seen that the mapping definitions 6a include information regarding the form and repetition of fields for controlling the conversion process.

In other embodiments, the invoices are uploaded and/or downloaded using virtual private network (VPN) connections to the invoice routing system 14.

It will be appreciated that many modifications can be made to the embodiment described above. In particular, the allocation of processing tasks to particular machines may be changed. At one extreme all of the functions of the invoice routing system 14 could be performed using one computer. At another extreme each process may be performed in parallel on many machines with clustering of servers for the data warehouse. Furthermore, one or more of the personal computers could be replaced by mini-computers or mainframes. It is the ability of these computers to communicate with each other that is important rather that the particular types of computers used.

What is claimed is:

1. An invoice routing apparatus comprising:
   an invoice receiver for receiving data corresponding to a plurality of invoices from a plurality of sources;
   a database for storing input invoice mapping definitions;
   an input processor device for processing the data corresponding to the plurality of received invoices within said invoice routing apparatus, the data for each invoice being converted by said input processor into an intermediate invoice in a standard intermediate form having predetermined characteristics and to provide the intermediate invoice in a data warehouse; the input processor configured to select an invoice mapping definition from the database in dependence on the sender of each received invoice and using the selected input invoice mapping definition when converting said data for the received invoice into said intermediate invoice;
   an output processor device configured to convert each of said intermediate form invoices obtained from the data warehouse into a final invoice in a form selected in dependence on an identity of a party being invoiced, the output processor obtaining an invoice destination identification from each intermediate invoice and selecting an output invoice mapping definition in dependence on the invoice destination identification; and
   an invoice transmitter device for transmitting each of the final invoices from said invoice routing apparatus to the party being invoiced;
   said input processor device further being configured to:
   add static data to the data corresponding to the received invoices when processed into said standard intermediate form, the static data added in dependence on the identity of the sender and the party being invoiced;
   add dynamic data to the data corresponding to the received invoices when processed into the standard intermediate form, the dynamic data added in dependence on the identity of the sender and of the party being invoiced; and,
   validate the data corresponding to the received invoices when processed into the standard intermediate form before transmission by said transmitter to the party being invoiced to ensure that the party being invoiced receives the data necessary for processing the invoice.

2. An apparatus according to claim 1 wherein the static data comprises the name and address of the source of the invoice.

3. An apparatus according to claim 1 wherein the dynamic data includes a transaction code, a transaction id and the mapping definition.

4. An apparatus according to claim 1, further comprising storage means for storing said intermediate invoices produced by the input processor, said output processor receiving said intermediate invoices from the storage means.

5. An apparatus according to claim 1, further comprising storage means for storing the plurality of received invoices.

6. An apparatus according to claim 2, wherein the input processor identifies a source of a received invoice, the source being a buffer location and selects an input invoice mapping definition in dependence on the source.

7. An apparatus according to claim 6, wherein the input processor produces a plurality of intermediate invoices in correspondence to a collection of invoices received together.

8. An apparatus according to claim 1, wherein the output processor obtains an invoice destination identification from each intermediate invoice and selects an output invoice mapping definition in dependence on the invoice destination identification.

9. An apparatus according to claim 8, wherein the output processor is configured to send the final invoices to a buffer means selected in dependence on the invoice destination identification.

10. An apparatus according to claim 1, wherein the received invoices and the final invoices are comprised of data files.

11. An apparatus according to claim 1, wherein the intermediate invoices are comprised of data placed in tables and stored in a database.

12. An apparatus according to claim 11, wherein each table contains data from a plurality of received invoices and each received invoice provides data for a plurality of tables of said database.

13. An apparatus according to claim 1 wherein the input processor and the output processor are configured to process the data corresponding to the invoices in layer 7 of the Open System Interconnections networking reference model.

14. An invoice routing method comprising:
receiving data corresponding to a plurality of invoices from a plurality of sources;
storing input invoice mapping definitions;
providing an input processor device and configuring the input processor device for performing an input processing of the data corresponding to the plurality of received invoices, converting the data for each invoice into an intermediate invoice in a standard intermediate form having predetermined characteristics and providing the intermediate invoice in a data warehouse;
configuring the input processor device for selecting an invoice mapping definition from the store in dependence on the sender of each received invoice and using the selected input invoice mapping definition when converting said data for the received invoice into said intermediate invoice;
providing an output processor device and configuring the output processor device for performing an output processing for converting each of said intermediate form invoices obtained from the data warehouse into a final invoice in a form selected in dependence on an identity of a party being invoiced,
configuring the output processor device for obtaining an invoice destination identification from each intermediate invoice and selecting an output invoice mapping definition in dependence on the invoice destination identification; and
transmitting each of the final invoices to the party being invoiced;
said input processing by said input processor device further including:
adding static data to the data corresponding to the received invoices when processed into said standard intermediate form, adding the static data in dependence on the identity of the sender and the party being invoiced;
adding dynamic data to the data corresponding to the received invoices when processed into the standard intermediate form, adding the dynamic data in dependence on the identity of the sender and the party being invoiced; and,
validating the data corresponding to the received invoices when processed into the standard intermediate form before transmission to the party being invoiced to ensure that the party being invoiced receives the data necessary for processing the invoice.

* * * * *